May 5, 1964
R. E. MARRS
3,132,293
PLURAL MOTOR DRIVE FOR ROLLING MILL WINDING REEL
Filed July 11, 1961
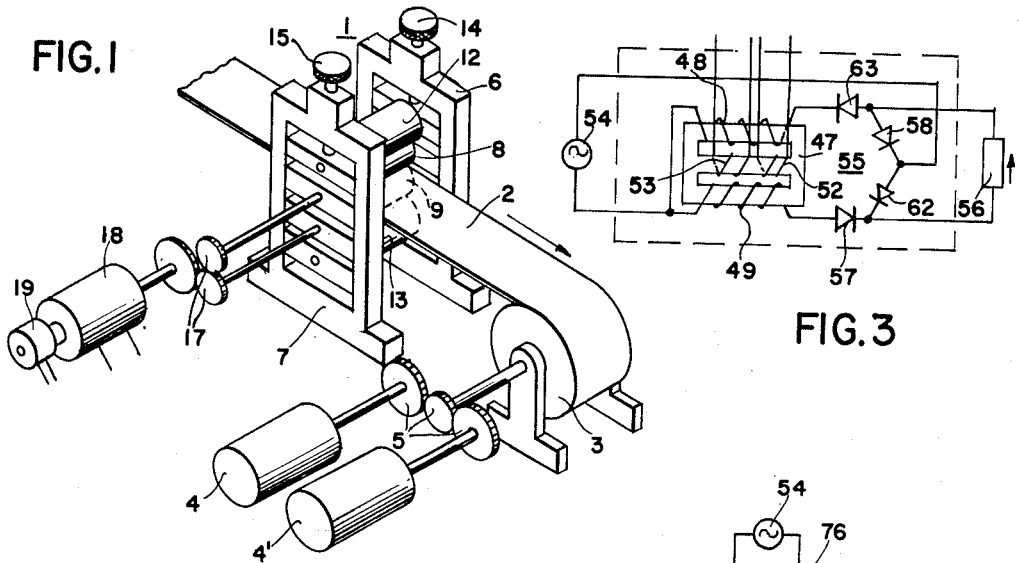
FIG.1
FIG.3
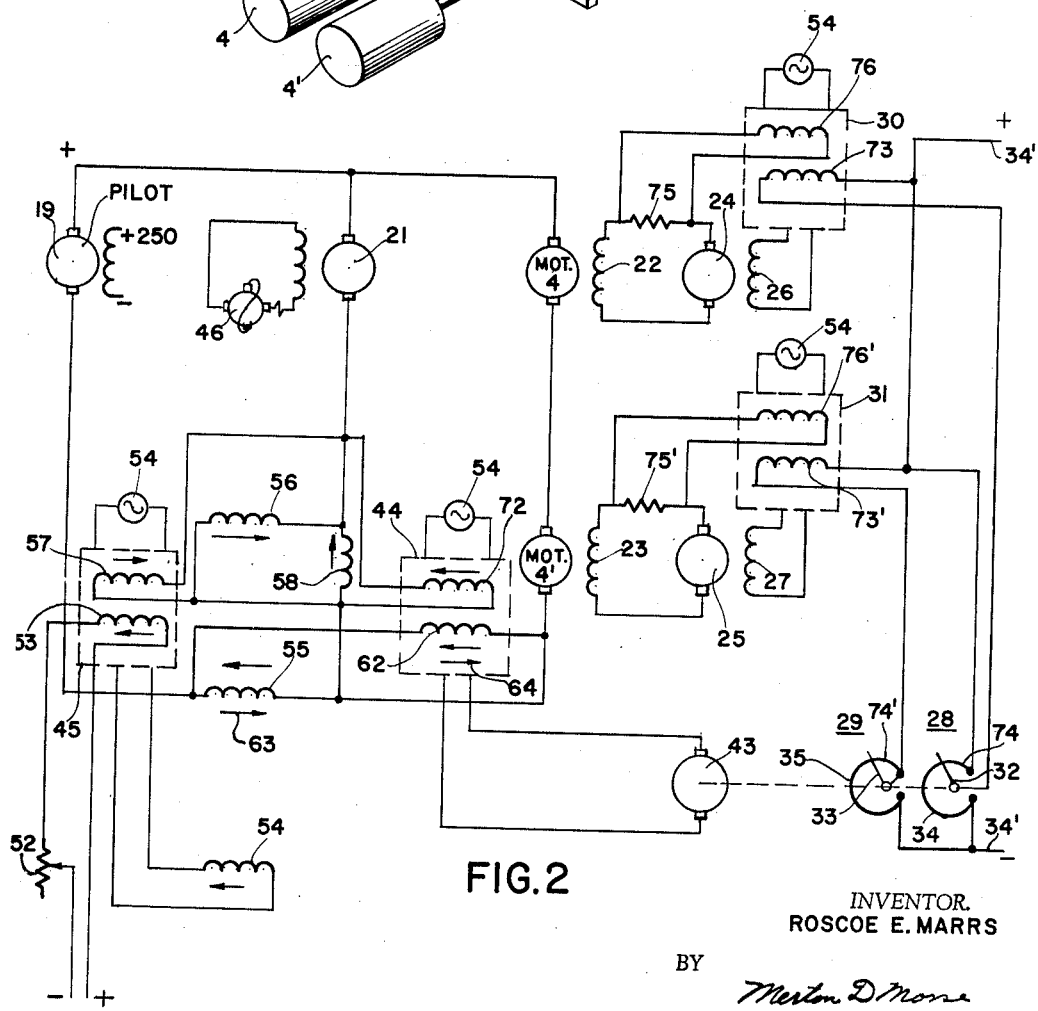
FIG.2
INVENTOR.
ROSCOE E. MARRS
BY
Merton D. Moore
ATTORNEY United States Patent Office 3,132,293
Patented May 5, 1964

3,132,293
PLURAL MOTOR DRIVE FOR ROLLING
MILL WINDING REEL
Roscoe E. Marrs, Schenectady, N.Y., assignor to General
Electric Company, a corporation of New York
Filed July 11, 1961, Ser. No. 123,244
1 Claim. (Cl. 318—46)

My invention relates to motor drives for rotating loads requiring high power and operating over a wide range of speeds. It has for one of its objects to provide such a motor drive using standard equipment and at reduced cost.

One application for my invention arises in connection with motor drives for the winding reels used in strip steel mills. Steel strip coming from the mill stands is placed under tension and wound onto such reels by the motor drives which rotate the reels. These drives may require a power drive capacity of, for example, 3500 horsepower and a speed range in the neighborhood of 250 to 1300 revolutions per minute, the higher speeds occurring during the period of the winding operation when the reel is nearly empty and the lower speeds occurring during the final period in the winding operation when the reel is nearly full.

In certain equipments heretofore provided this power has been provided by six motors geared to the reel by a 1:1 gear ratio, each motor having a power rated capacity in the neighborhood of 600 horsepower and the speed range of 250 to 1300 r.p.m. This drive involves specially designed equipments and is extremely expensive.

An object of my invention is to provide a drive for such reels utilizing standard motors, driven by a standard generator and combined together in such a way as to provide both the required power capacity and speed range at materially reduced cost. In fact, computations of cost of equipment for one installation in accord with my invention shows a saving in the neighborhood of fifty thousand dollars over equipment of the type heretofore provided for the purpose. This is true even though, in accord with my invention, two motors are used each having 3500 horsepower rated capacity—each sufficient, by itself, to drive the reel.

In accord with my invention two motors of standard manufacture of 3500 horsepower rated capacity are utilized each having a rated speed range of 100 to 260 r.p.m. These motors are geared to the reel through a 5 to 1 gear ratio, insufficient of itself to provide the low speeds required to drive the reel.

These motors are connected in series across a generator having the same voltage rating as each of the motors. Means are provided to reduce the field excitation, on one of the motors to the minimum value required for stable operation, and that on the other motor to zero, during the initial period in the reeling operation. This means that the entire voltage of the generator appears across the armature of the one motor having minimum excitation for stable operation whereby that motor drives the reel at the higher speeds required during the early stages of the reeling operation.

Means are also provided to increase the excitation on both motors as steel strip is wound onto the reel, and the speed correspondingly reduces, until full rated excitation is provided on both motors. Then, because of the series connection, both motors operate at half voltage, and at half speed thereby to provide the low speed required in the desired 250 to 1300 r.p.m. range of the reel. At the same time, since both of the motors are of 3500 horsepower rating, a total of 3500 horsepower is available at all times to drive the constant horsepower reel load over its rated speed range.

The novel features which I believe to be characteristic of my invention are set forth with particularity in the appended claim. My invention itself, however, both as to its organization and method of operation, together with further objects and advantages thereof, may best be understood by reference to the following description taken in connection with the accompanying drawing in which FIG. 1 represents an application in which my invention finds utility; FIG. 2 represents a control circuit which may be utilized for control of the motors of FIG. 1; and FIG. 3 represents a typical well-known self-saturating magnetic amplifier, a number of which are employed in the circuit of FIG. 2.

Referring to FIG. 1 of the drawing, this figure illustrates very conventionally a mill stand 1, which may be the final stand of a steel rolling mill, from which a steel strip 2 is passed under tension to a reel 3. Reel 3 is driven by a pair of motors 4 and 4', which are geared by means of gears 5 to the shaft of the reel.

The stand may comprise a pair of frame members 6 and 7 supporting between them a pair of rolls 8 and 9, one above the strip and the other below the strip, each being provided with a back-up roll 12 and 13 to provide pressure upon the strip, this pressure being regulated by means of screw downs 14 and 15. The rolls 8 and 9 are geared together by gears 17, which are driven by a motor 18, on the shaft of which is a direct current pilot generator 19 for purposes later to be indicated.

In the starting operation of the mill the end of the strip is attached to the reel and the motors 4 and 4' are energized to give the reel a tendency to rotate, thereby to place the strip under desired tension. Thereafter, the mill stand is started by energization of the motor 18 and the motors 4 and 4' start to drive the reel. Since the reel at this time is small, the reel operates at its fastest speed. After the mill has been started this speed gradually reduces as strip is wound upon the reel until it attains its lowest speed when the reel is fully loaded.

During this time the speed of the motor varies from about 1300 r.p.m. after first coming up to speed to a speed of 250 r.p.m. when it is fully loaded, this speed variation being in a ratio of about 5.2 to 1.

In order most economically to provide motor capacity sufficient to drive the reel which requires about 3500 horsepower, in accord with my invention two motors are employed of standard manufacture each having 3500 horsepower rated capacity and having a rated speed range of from 100 r.p.m. to 260 r.p.m., these motors being geared by the gears 5, having a gear ratio of 5 to 1, to the shaft of the reel.

Thus, during the starting operation and placing the initial wraps upon the reel, the motors must operate at the highest speed of 260 r.p.m. in their rated range but deliver half of their total power capacity to the reel. This drives the reel at the desired top speed of 1300 r.p.m.

During the final period in the reeling operation, when the reel is nearly loaded, the motors must operate to deliver half of their total capacity at 50 r.p.m., which is half of the lowest rated speed of the motors. This drives the reel at its lowest speed of 250 r.p.m.

To effect this control the means shown in FIG. 2 are employed in which the motors 4 and 4' have their armatures connected in series across the generator 21 which supplies the necessary power. This generator is adapted to supply to the series connection of motors 4 and 4' voltage for which each of the motors is rated to operate. The motors are provided with field windings 22 and 23, which are supplied with voltage from exciters 24 and 25, respectively, which, in turn, have field windings 26 and 27, respectively, the energization of which are controlled by rheostats 28 and 29 through self-saturating magnetic amplifiers 30 and 31, respectively, commonly referred to as amplistats.

These rheostats have brushes 32 and 33 which, at the start of the reeling operation, have positions on resistance elements 34 and 35 about as shown thereby to adjust the motor 4 for zero field excitation and motor 4' for minimum field excitation for stable operation, whereby the entire voltage of the generator appears across the armature of motor 4' and that motor drives the reel and may supply its full rated power.

During the reeling operation the brushes 32 and 33 are rotated by motor 43 in a counter-clockwise direction over the resistance elements 34 thereby to increase the current input to the amplistats 30 and 31 thereby to increase the field excitation on the motors 4 and 4' until at minimum speed full field is supplied to both motors. Now, since full field is supplied to both motors, the generator voltage divides equally between the armatures of the two motors 4 and 4' and the two motors operate at half voltage, half total rated horsepower, and half rated speed, i.e., at 50 r.p.m., thereby driving the reel at the minimum required speed of 250 r.p.m.

Motor 43 is energized to drive the brushes 32 and 33 by means of a third amplistat 44 which is jointly controlled by current in the armatures of motors 4 and 4' and current produced by the pilot generator 19 driven by the shaft of the mill motor 18.

One further amplistat 45 is utilized in the starting operation to adjust the initial excitation of generator 21, which excitation is supplied by an amplidyne generator 46, thereby to supply sufficient current to the motors to produce desired initial tension on the strip.

The amplistats 30, 31, 44 and 45 may be of any desired type, a typical and well-known one of which is illustrated in FIG. 3 as comprising a three-legged iron core, two of the legs of which are provided with gate windings 48 and 49, respectively, and the third leg of which is provided with a plurality of control windings, of which two, 52 and 53, are illustrated. Alternating current voltage from a source 54, which may be the same source for all of the amplistats, is supplied through the gate windings 48 and 49, and full wave rectifier 55 to produce direct current in the load. Thus, during one half cycle current flows through winding 49, rectifier 57, load 56, and rectifier 58 and, during the next half cycle current flows from the source through rectifier 62, load 56 and rectifier 63, thereby producing direct current output on load 56.

Assuming that the control windings are deenergized flux builds up in the core during each half cycle when the rectifier is conducting and produces saturation at a time in the half cycle, which may be the peak of the wave. Prior to such time the gate windings have high impedance and small current flows to the load. After saturation the flux does not change and the windings have low impedance and large current flows to the load. By varying the time in the half cycle where saturation occurs the current supplied to the load may be varied over a wide range. This control is effected by the direct current energization of windings 52, 53 and others where required.

For example, if flux be produced by the control windings having the direction of the flux produced by the rectified current in the gate windings, then saturation occurs earlier in the half cycle and the current in the load is increased. If flux produced by the control windings is of opposite direction, then saturation occurs later in the half cycle and current in the load is reduced. Thus, by varying the magnitude and polarity of total flux produced by the control windings, the current in the load may be varied from a maximum when the amplistat is fully on, to a minimum when the amplistat is fully off. By use of a plurality of control windings energized from varying sources, the varying effects hereafter referred to are readily had.

For a more detailed description of the structure and operation of the system, consider the mill at stand still, motors 4 and 4' deenergized, and exciter 46 and generator 21 being mechanically driven without excitation.

The operator first adjusts rheostat 52, shown in the lower left-hand corner of the drawing, which is in the direct current supply circuit to control winding 53 of amplistat 45, to produce proper energization of control winding 53 of amplistat 45 to permit current to flow in winding 59. This winding 59 is one field winding on exciter 46, other field windings of this exciter being indicated at 55 and 56. Exciter 46 now energizes the field of generator 21 causing that generator to supply current to motors 4 and 4' and causing motor 4' to apply tension to the strip. Since motor 4 has zero field it does not deliver power. The amount of tension in the strip is adjusted to a desired value by adjustment of rheostat 52 and is regulated at such value by opposing flux produced in the amplistat 45 by control winding 57, the latter of which is connected across impedance 58 in series with the motors so that the energization of winding 57 is in proportion to the motor current.

Since pilot generator 19 is not operating, current flows from generator 21 through it and through exciter field winding 55 and winding 62 on amplistat 44 in the direction indicated by the arrows 63 and 64. Current in winding 62 helps to hold amplistat 44 off and motor 43 deenergized.

The operator now starts the mill by energizing motor 18 of FIG. 1 and the motors 4 and 4' start to drive the reel and to wind the steel strip thereon.

The pilot generator starts to supply current to exciter field winding 55 and control winding 62 reversing the direction of current in both of these windings, the current in winding 55 now increasing the field on the generator 21 and the voltage produced by the generator, and the current in winding 62 being in a direction tending to turn amplistat 44 on but being of itself as yet insufficient to start motor 43.

The motors 4 and 4' now come up to speed the pilot generator increasing the field on the generator to cause it to supply its rated voltage to the series connection of motors 4 and 4'.

During operation, as the diameter of the steel in the reel increases, line current through the motors and through impedance 58 tends to increase. This increases the current in control winding 57 of amplistat 45, which opposes the current in winding 53 of that amplistat, thereby reducing the current in field winding 59 of the exciter 46 and reducing the generator voltage. This regulates tension in the strip as before. The increase in line current also increases the current in control winding 72 of amplistat 44, which aids winding 62 of that amplistat and turns amplistat 44 on thereby starting motor 43.

Motor 43 now operates the brushes 32 and 33 away from the position shown and in a counter-clockwise direction over the resistance elements 34 and 35. It will be noticed that in the starting position shown, winding 73 of amplistat 30 is directly short circuited by brush 32 and the small portion 74 of resistor element 34 to the right of the point of contact of brush 32 therewith. This small portion may be of desired small value of resistance so that winding 73 receives insufficient current to produce any substantial excitation of exciter field winding 26. As brush 32 moves counter-clockwise more of resistance 34 is removed from the series circuit of winding 73 and is transferred to the path in shunt to that winding, thereby increasing current in control winding 73 and in the field 26 of exciter 24.

Resistance 75 is connected in series with exciter 24 and motor field winding 22, the voltage of which is supplied to control winding 76 of amplistat 30 with direction to oppose winding 73, thereby to produce a regulating action to maintain the motor field at a value determined by rheostat 28.

A similar regulating action of the field of motor 4' occurs by reason of corresponding elements 75' and 76'.

In rheostat 29, however, portion 74' of resistance element 35 is itself short circuited by brush 33 in the position shown so that sufficient current flows in control winding 73' from the power supply leads 34' to produce minimum excitation of windings 27 and 23 to produce stable operation of motor 4'.

During the increased motor current as the reel increases in diameter motor 43 continues to drive brushes in the clockwise direction reducing the resistance in series with 73 and 73' and increasing field on the motors. At the same time amplistat 45 regulates the tension in the strip and amplistats 30 and 31 regulates the motor field excitation to progressively higher levels determined by the position of brushes 32 and 33 of the rheostats until full field is applied. Then the counter electromotive force of the motor armatures reduces the motor current sufficiently to reduce the current in winding 72 sufficiently to deenergize motor 43.

The motors 4 and 4' now operate at half rated voltage and at half speed each delivering half the power applied to drive the reel.

While I have shown a particular embodiment of my invention, it will be understood that modifications may be made therein and that I contemplate by the appended claim to cover any such modifications as fall within the true spirit and scope of my invention.

What I claim as new and desire to secure by Letters Patent of the United States is:

In a drive for a reel on which stripped material is wound as it comes from the mill in which it is processed, said reel and stripped material increasing in diameter during the rolling and said reel reducing correspondingly in speed, a pair of high power low speed motors each geared to said reel through a step up gear ratio approximating the ratio of decrease in speed, generating means including a generator, said motors being connected in series across said generator and being designed for operation over a narrower ratio of speeds than the ratio of change in speed and said reel during the reeling operation, a first magnetic amplifier first excitation means controlled by said first magnetic amplifier for exciting a first one of said motors, a second magnetic amplifier second excitation means controlled by said second magnetic amplifier for exciting a second one of said motors, a first rheostat connected to control said first magnetic amplifier, a second rheostat connected to control said second magnetic amplifier, connections in said first rheostat to said first magnetic amplifier whereby said first magnetic amplifier may be controlled so that said first motor has zero field excitation, connections in said second rheostat to said second magnetic amplifier whereby said second motor has weak field excitation at the beginning of a reeling operation when the reel diameter is small whereby the entire driving power is applied by the motor having weak field excitation to produce the required highest speed, a third motor connected to control said first and second rheostats and means responsive to the line current through said pair of motors for controlling said third motor and thereby said first and second rheostats to increase the fields on both motors as the reel diameter increases to maximum when the reel is full thereby to produce the required low speed of said pair of motors.

References Cited in the file of this patent
UNITED STATES PATENTS
2,862,161    Abell _____ Nov. 25, 1958
FOREIGN PATENTS
612,951    Great Britain _____ Nov. 19, 1948
903,602    Germany _____ Feb. 8, 1954